United States Patent
Bryant

[15] 3,684,423
[45] Aug. 15, 1972

[54] BURNER CONTROL SYSTEM
[72] Inventor: Jack A. Bryant, Boston, Mass.
[73] Assignee: Electronics Corporation of America, Cambridge, Mass.
[22] Filed: Nov. 23, 1970
[21] Appl. No.: 92,061

[52] U.S. Cl. .................................................. 431/24
[51] Int. Cl. ........................................................ F23n
[58] Field of Search ..................... 431/14, 15, 24–26, 431/69–71

[56] References Cited

UNITED STATES PATENTS

3,324,927    6/1967    Staring ..................... 431/24 X

Primary Examiner—Carroll B. Dority, Jr.
Attorney—Willis M. Ertman

[57] ABSTRACT

A burner control system includes a plurality of field indicators indicative of the status of components of the burner system, control logic responsive to the field indicators for control burner control signals, logic bypass control and circuitry responsive to the logic bypass control for establishing the status of the control logic as a function of the field indicators so that the control logic is maintained in synchronism with the field indicators.

11 Claims, 9 Drawing Figures

BURNER CONTROL SYSTEM

SUMMARY OF INVENTION

This invention relates to burner control systems and more particularly to management systems for components of such control systems.

In a burner control system, one or more burners are supervised in a manner which provides proper sequencing of components of the burner system in a safe manner. Logic responsive to component status conditions may be utilized to provide control function signals as a function of the status of those components. On occasion, for example, for routine maintenance or repair, it may be necessary to remove the supervising control logic from service and allow the burner system to operate in a mode unsupervised by the control logic. The logic must be aligned with the component status (field) conditions prior to transfer of control to the logic to avoid an unnecessary shutdown of the burner system.

In accordance with the invention there is provided a burner control system having a plurality of field indicators and a logic system responsive to the field indicators for providing burner control signals, a logic bypass control, circuitry responsive to the logic bypass control for establishing the status of the logic system as a function of the field indicators so that the logic system is in synchronism with the field indicators when control of the burner is returned to the logic system by releasing the logic bypass control.

In a particular embodiment, the burner has main and secondary (igniter) fuel burners, and associated fuel and air flow controls and flame detectors. The burner management system is in the form of a sequential logic system that employs solid state static switching circuits. Input signals from the field are introduced to the logic through input interfaces and that information is interrogated by the logic and appropriate commands are generated to control the associated field equipment through output interfaces. Limit switches located on the field equipment feed back information indicating the status of the field equipment. In the logic bypass or "manual" mode of operation, supplemental logic updates the logic system to force the logic into proper alignment with the actual field conditions on switching to the control logic or "automatic" mode of operation. If there are any field conditions that are not proper or safe (such as a burner valve not fully open when the burner is on) this supplemental logic will indicate a burner trip (shut down) condition and will initiate a burner trip when the transfer from manual to automatic mode is made. In the manual mode of operation, a clock in the supplemental logic generates signals which clear memories in the logic system every 10 milliseconds. These memories are reset in accordance with signals from the field indicators. This process of clearing the memories and re-establishing the field condition indications is repeated every ten milliseconds while the burner is in the manual mode of operation. Any change in field condition will be immediately detected by this logic and appropriate memories will be set within ten milliseconds. If at any time the field conditions are not normal or an appropriate memory fails to set, digital comparator circuits detect this condition and provide a trip indication. Further, if this trip condition prevails when a transfer is made from manual to automatic mode of operation is attempted, a burner trip signal will also be generated. The invention thus facilitates the supervision and maintenance of burners.

Other objects, features and advantages of the invention will be seen as the following description of a particular embodiment progresses in conjunction with the drawings, in which:

DESCRIPTION OF PARTICULAR EMBODIMENT

Figure 1:
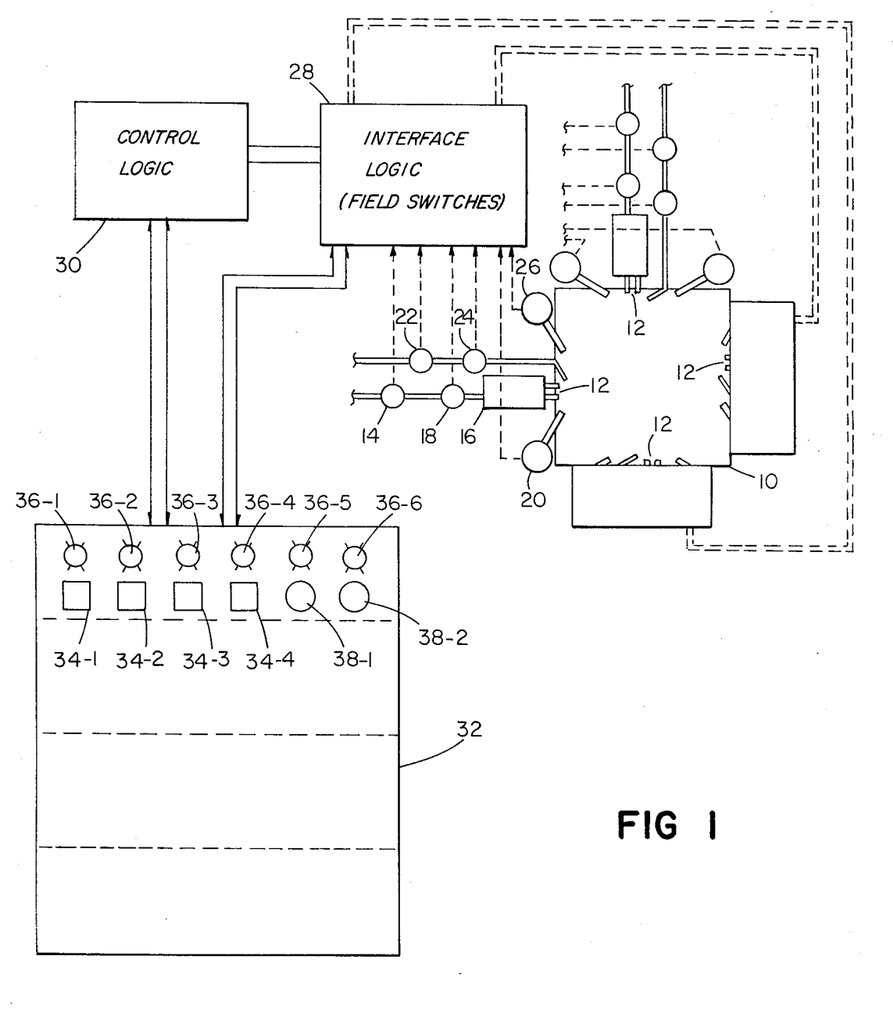
FIG. 1 is a block diagram of a burner control system constructed in accordance with the invention.

With reference to FIG. 1, the system is used for supervising a combustion chamber diagrammatically indicated at 10 which has several burners 12, each of which includes a main burner system that includes a fuel valve 14, an air register 16, a fuel pressure sensor 18 and a flame detector 20; an igniter system that includes igniter valve 22, a fuel pressure sensor 24 and an igniter flame detector 26.

Field switches, generally indicated at 28, indicate the status of devices 14-26 and apply signals to control logic 30 which indicates the status of the supervised burner and provides automatic control of the supervised burner system. A remote control panel 32 receives signals from the control logic 30 and also supply signals to it to control the burner system. The control panel 32 includes control push buttons generally indicated at 34, indicators generally indicated at 36 and a manual-automatic control 38. Additional details of the control logic 30 and its interaction with the field switches 28 and the control panel 32 will be seen with reference to FIGS. 2-7.

Figure 2:
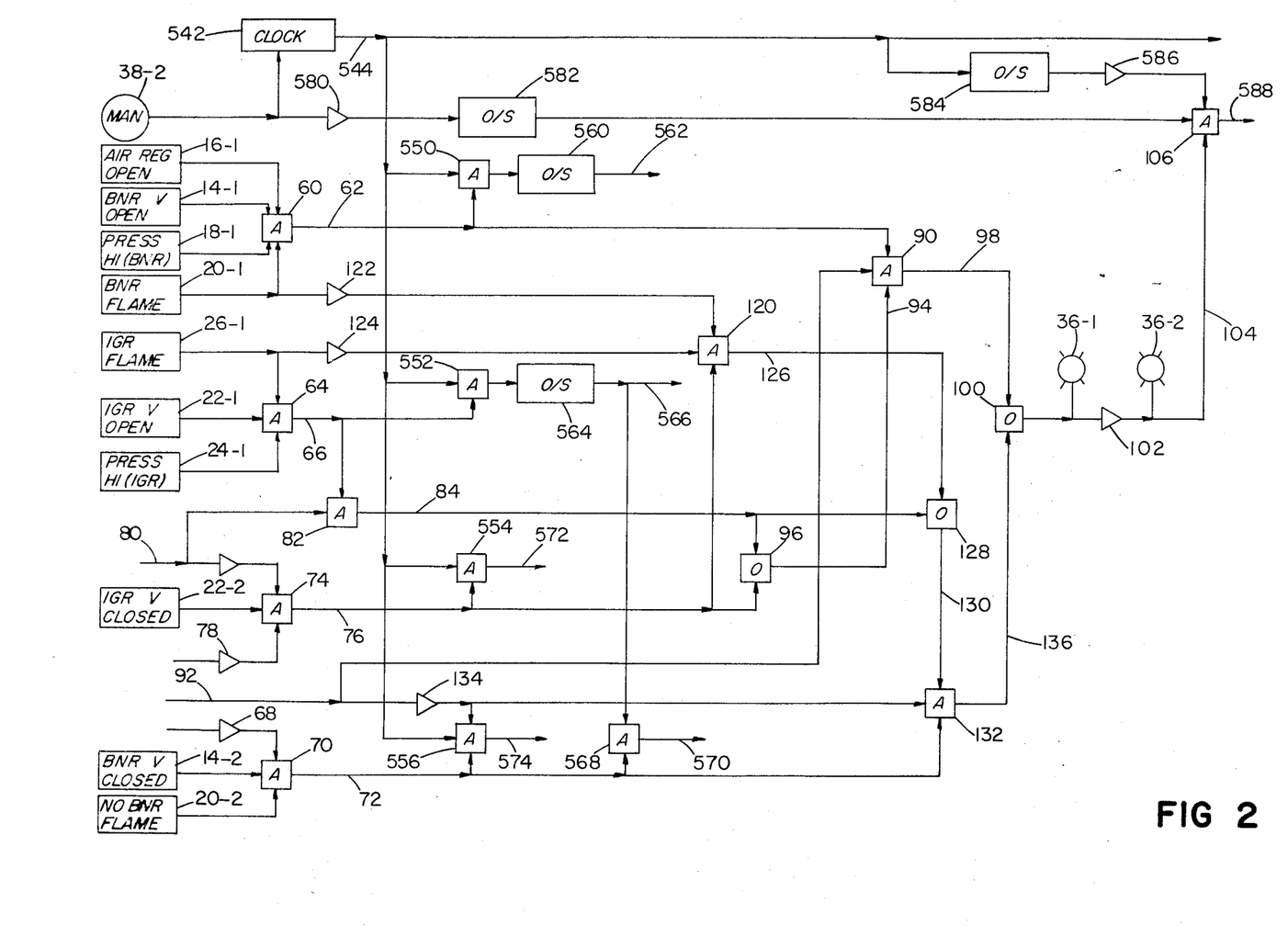
FIG. 2 is a logic diagram of a portion of the logic including the bypass control logic employed in the system shown in FIG. 1.
Figure 3:
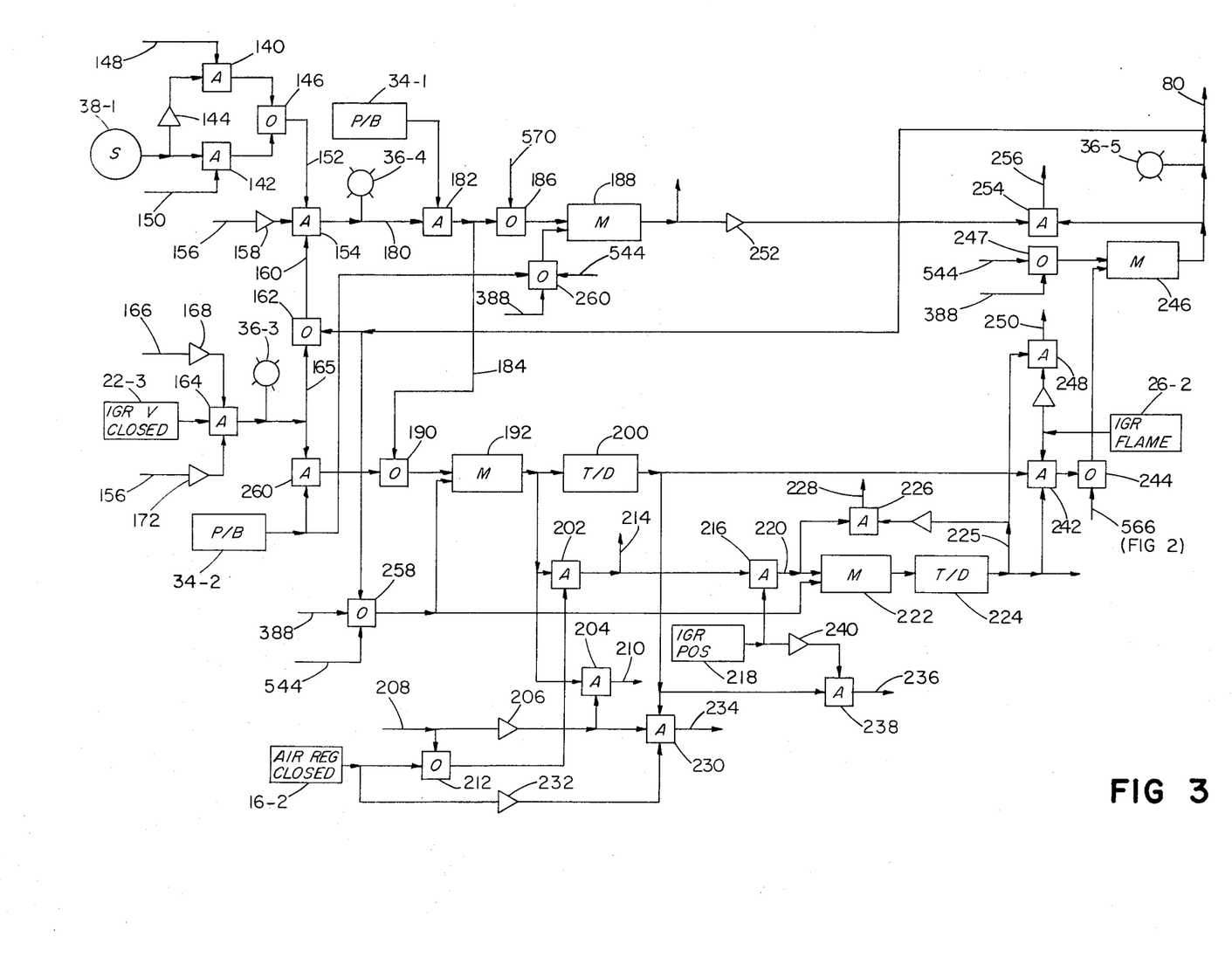
FIG. 3 is a logic diagram of a portion of the logic including the igniter start logic incorporated in the system shown in FIG. 1.

Supervising logic shown in FIG. 2 responds to field switches. Thus switch 14-1 provides a signal that indicates the burner fuel valve 14 is open; switch 18-1 provides a signal that indicates the fuel pressure downstream from the burner fuel valve is provided by sensor 16 is high; switch 16-1 provides a signal indicating that the air register 16 is open; and switch 20-1 provides a signal indicating that the flame detector 20 sees flame. Those signals are applied to an AND-circuit 60 and its output on line 62 indicates that the burner is on. In similar manner, switch 22-1 provides a signal indicating that the igniter valve 22 is open; switch 24-1 provides a signal indicating that the pressure downstream from igniter valve 22 as indicated by sensor 24 is high; and switch 26-1 provides a signal indicating that the igniter detector 26 detects flame. These signals applied to AND-circuit 64 whose output on line 66 indicates that the igniter is on. Switch 14–2 provides a signal indicating that the burner valve is closed and switch 20–2 provides a signal indicating the absence of flame at the burner. Those signals, together with the signal from sensor 16 through inverter 68 are applied to AND-circuit 70 whose output signal on line 72 indicates that the burner is off. In similar manner, AND-circuit 74 has an output on line 76 when switch 22–2 produces an output signal (indicating that the igniter valve is closed); inverter 78 provides a signal indicating that pressure downstream from the igniter valve 22 is low; and the signal "Lg" on line 80 from the igniter logic shown in FIG. 3 is not present. If the logic signal on line 80 is present together with a signal on line 66, AND-circuit 82 has an output on line 84 indicating that ignition is proven on.

The "burner on" signal on line 62 is applied to one input of AND-circuit 90. A second input to AND-circuit 90 over line 92 ("Bg" from the burner logic FIG. 4) also indicates that the burner is on and a third input to AND-circuit 90 over line 94 from OR-circuit 96 indicates that the igniter is not in startup or shutdown (from signals from lines 76 and 84). The output of AND-circuit 90 on line 98 indicates that there is no reason to trip from burner considerations and that signal is applied to OR-circuit 100 to energize the no trip indicator 36–1 on the burner control panel 32. Should that signal be absent, a trip indicator 36–2 is energized by the signal passed by inverter 102 and that trip indication signal is also applied on line 104 to one input of AND-circuit 106.

AND-circuit 120 has an input from flame sensor switch 20–1 through inverter 122 indicating that the burner flame detector 20 does not see flame; a second input from igniter flame sensor 26 through inverter 124 indicating that the igniter flame sensor 26 does not see flame, and a third input on line 76 indicating that the igniter system is not on. The output of AND-Circuit 120 on line 126, indicating that the igniter is off and the burner flame is off, is applied one input to OR-circuit 128 which has the second input from line 84 (that signal indicating that the igniter is proven on). Either of these conditions causes OR-circuit 128 to produce an output signal on line 130 indicating that the status of the igniter is okay, that is it is either safely on or safely off, which output signal is applied to AND-circuit 132. AND-circuit 132 has a second input from line 92 via inverter 134, indicating that the burner system is off as determined by the logic; and a third signal from line 72 indicating that the burner is off as indicated by the condition of the field switches. The output of AND-circuit 132 on line 136 indicates that there is no reason to trip due to igniter conditions and that signal is applied through OR circuit 100 to energize the no trip indicator 36–1.

The igniter start logic is shown in FIG. 3. A steering circuit controlled by a selector switch 38–1 includes two AND-circuits 140, 142, an inverter 144 and an OR-circuit 146. AND-circuit 140 has an input from gas supply on line 148 and a second input through inverter 144 from the oil select switch 38–1 so that AND-circuit 140 produces an output if switch 38–1 is in the position to select the gas fuel and that fuel system is ready. AND-circuit 142 has an input on line 150 indicating that the oil supply is ready and a second input from switch 38–1 indicating that the oil is the selected fuel. The output of OR-circuit 146 is applied over line 152 to AND-circuit 154. That AND circuit has an input from remote logic (FIG. 6) on line 156 via inverter 158 which inhibits start of the burner when present and an input on line 160 from OR-circuit 162.

OR-circuit 162 has an input from AND-circuit 164 on line 165 which output indicates that ignition circuits are ready and illuminates an indicator 36–3. AND-circuit 164 has a first input from field switch 22–3 indicating that the igniter shutoff valve 22 is closed, a second input from line 166 via inverter 168 from igniter trip logic (FIG. 5) indicating that the igniter start is not inhibited; and a third input from line 156 via inverter 172 indicating absence of a similar inhibition from the burner trip logic (FIG. 6). The output of AND-circuit 164 also energizes lamp 36–3.

A second input to OR-circuit 162 is from line 80 which indicates the igniter system is on. In that condition AND-circuit 154 has an output on line 180 illuminating the indicator light 36–4 indicating that the burner is ready and conditioning one input of AND-circuit 182. In response to depression of burner start pushbutton 34–1, AND-circuit 182, if conditioned, produces an output on line 184 which is passed by OR-circuit 186 to clear igniter only memory 188 and by OR-circuit 190 to set the igniter start memory 192. Memory 192, when set, triggers 50-second time delay 200 and also conditions AND-circuits 202 and 204. AND-circuit 204 has a second input via inverter 206 from line 208 ("oil burner on" signal) and its output on line 210 is a close burner register command and also prevents start of other burners or igniters. The signal on line 208 is also applied through OR-circuit 212 as a second input to AND-circuit 202. When the burner register 18 is closed, a signal is applied from switch 16–2 through OR-circuit 212 to cause AND-circuit 202 to produce an output on line 214 to move the igniter to firing position and to condition an input of AND-circuit 216. When the igniter is in firing position, field switch 218 produces an output to cause AND-circuit 216 to produce an output on line 220 to set memory 222 and start ten second time delay circuit 224. (Memory 222 stores the trial ignition signal until it is cleared by a signal from OR-circuit 258.) At the same time, AND-circuit 226 produces an output on line 228 to open ignition valve 22 and energize the spark circuit. This output (ignition) continues for 10 seconds. At the end of that 10-second trial for ignition interval timer 224 produces an output on line 225 which de-energizes the spark circuit; removes a conditioning input from AND-circuit 226; and conditions AND-circuit 248. A trip signal (line 250) is immediately established by AND-circuit 248 when timer 216 times out if flame has not been detected.

When timer 200 times out, a trip condition (line 234) is also established by AND-circuit 230 if the oil is not on, and the burner register is not closed (switch 16–2 via inverter 232); or the igniter is not in firing position (line 236 from AND-circuit 238 in response to switch 218 and inverter 240). However, if when timers 200 and 224 time out, ignition flame has been detected as indicated by sensor field contacts 26–2; AND-circuit 242 has an output which is applied through OR-circuit 244 to set Igniter On Memory 246.

Figure 4:
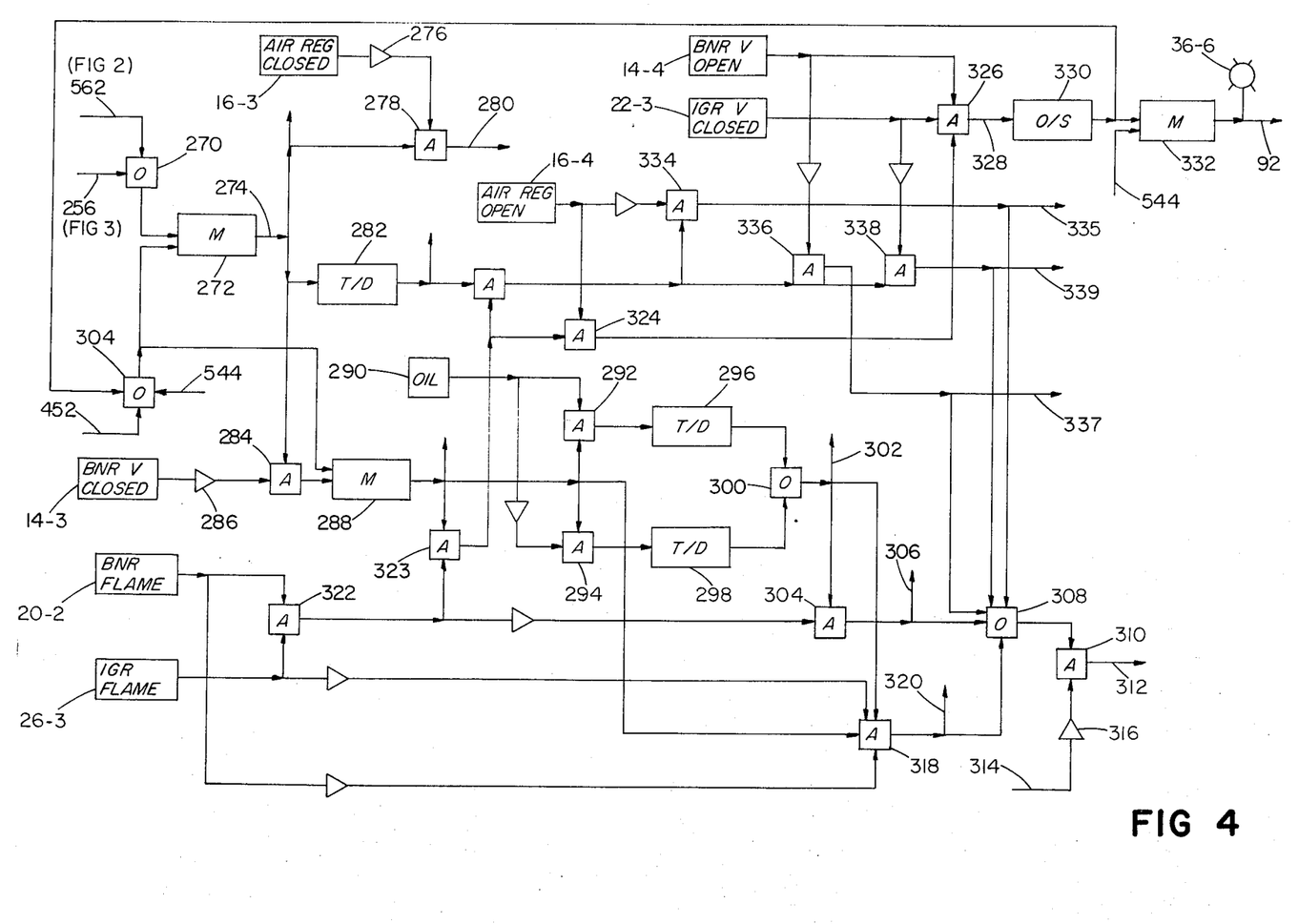
FIG. 4 is a logic diagram of a portion of the logic including the burner start logic incorporated in the system shown in FIG. 1.

If memory 188 is not set (indicated by a signal from inverter 252) AND-circuit 254 produces an output on line 256 which is applied to the burner start logic (FIG. 4). A lamp 36–5 (igniter on) is also illuminated on the control panel 32 and a signal is fed back through OR circuit 258 to reset the igniter start memory 192 and the trial memory 222.

Should the igniter start pushbutton 34–2 be depressed, memory 192 will be set via AND-circuit 260 and OR-circuit 190; and memory 188 will be cleared via OR-circuit 260 to initiate an ignition sequence as above described with the exception that AND-circuit 254 is inhibited due to the absence of the signal from inverter 252 so that the Start Burner signal on line 256 is not generated.

The burner start logic is shown in FIG. 4. The signal on line 256 indicating that the igniter is on is passed through OR-circuit 270 to set memory 272. The output of that memory is applied over line 274 to cause the air register 16 to open and to prevent start of other burners. When the air register 16 starts to open, field switch 16–3 provides a signal via inverter 276 that causes AND-circuit 278 to produce an output on line 280 to open the selected burner valve. The output of memory 272 is also applied to timer 282 and also to AND-circuit 284 which produces an output when the burner valve 14 starts to open as indicated by a signal from switch 14–3 via inverter 286 to set memory 288 which provides an indication that fuel is flowing into the combustion chamber from this supervised system.

The output of memory 288 is also applied to a steering circuit that indicates the fuel selected as a function of indicator 290 and includes AND-circuit 292 to select timer 296 having a time delay of 15 seconds or AND-circuit 294 to select timer 298 having a time delay of 10 seconds. When the selected timer times out a signal is applied through OR-circuit 300 to shut down the igniter by a signal on line 302 and if AND-circuit 322 does not have an output indicating that both flame detectors are seeing flame, AND-circuit 304 is conditioned to produce an output on line 306 initiating a burner trip sequence as flame has not been established within the allotted time. This signal is also applied through OR-circuit 208 and AND-circuit 310 to initiate a boiler fuel trip on line 312, if there are no other burners on as indicated by a signal on line 314 passed by inverter 316. A trip condition is also established by AND-circuit 318 if neither flame detector sees flame when memory 288 has an output by application of a signal to line 320.

As soon as the igniter and burner flame detectors 20 and 26 see flame, switches 20–2 and 26–3 close and AND-circuit 322 has an output which conditions AND-circuit 323 which output in turn conditions AND-circuit 324 which has a second input from the "Air Register Open" field switch 16–4 and its output is applied to AND-circuit 326. That AND circuit has a second input from the Burner Valve Open field switch 14–4 and a third input from the Igniter Valve Closed field switch 22–3 and if those conditions are satisfied, an output is applied on line 328 through one shot 330 to set the Burner On memory 332. The resulting output of memory 332 on line 92 energizes Burner On indicator 36–6 and enables the start of other burners as this startup sequence has been completed. The output of one shot 330 is also fed back through OR-circuit 304 to reset memories 272, 288.

When timer 282 times out (even though both flames have been detected as indicated by AND-circuit 320), if air register 16 is not fully open, a trip condition will be established by AND-circuit 334 and a signal on line 335; if the Burner Valve is not fully open, the trip condition will be established by AND-circuit 336 and a signal on line 337; and if the Igniter Valve is not closed, a trip condition will be established by AND-circuit 338 and a signal on line 339. Those trip signals are applied to OR circuit 308 and to OR-circuit 350 of the igniter trip logic shown in FIG. 5.

Figure 5:
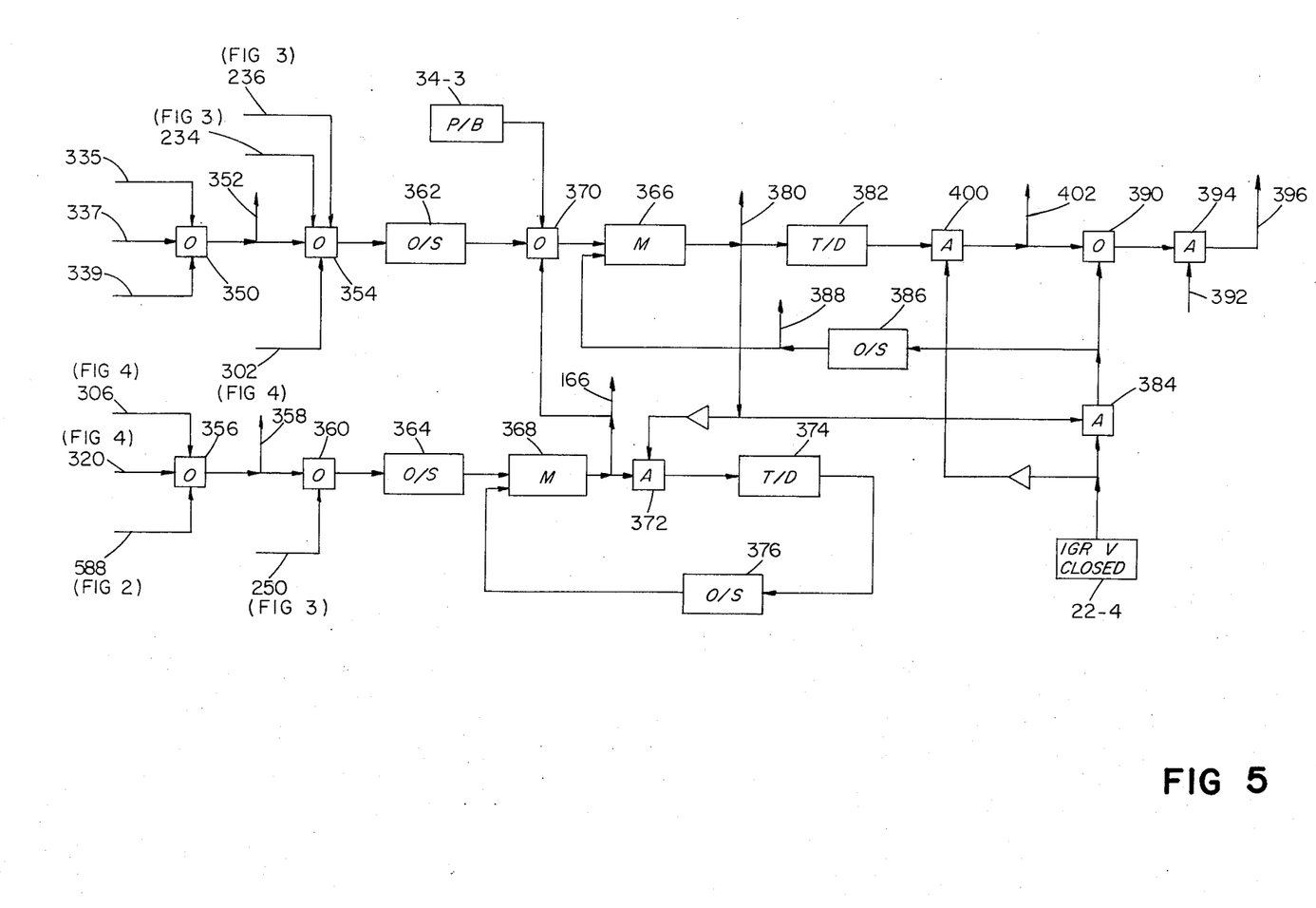
FIG. 5 is a logic diagram of a portion of the logic including the igniter shutdown logic incorporated in the system shown in FIG. 1.
Figure 6:
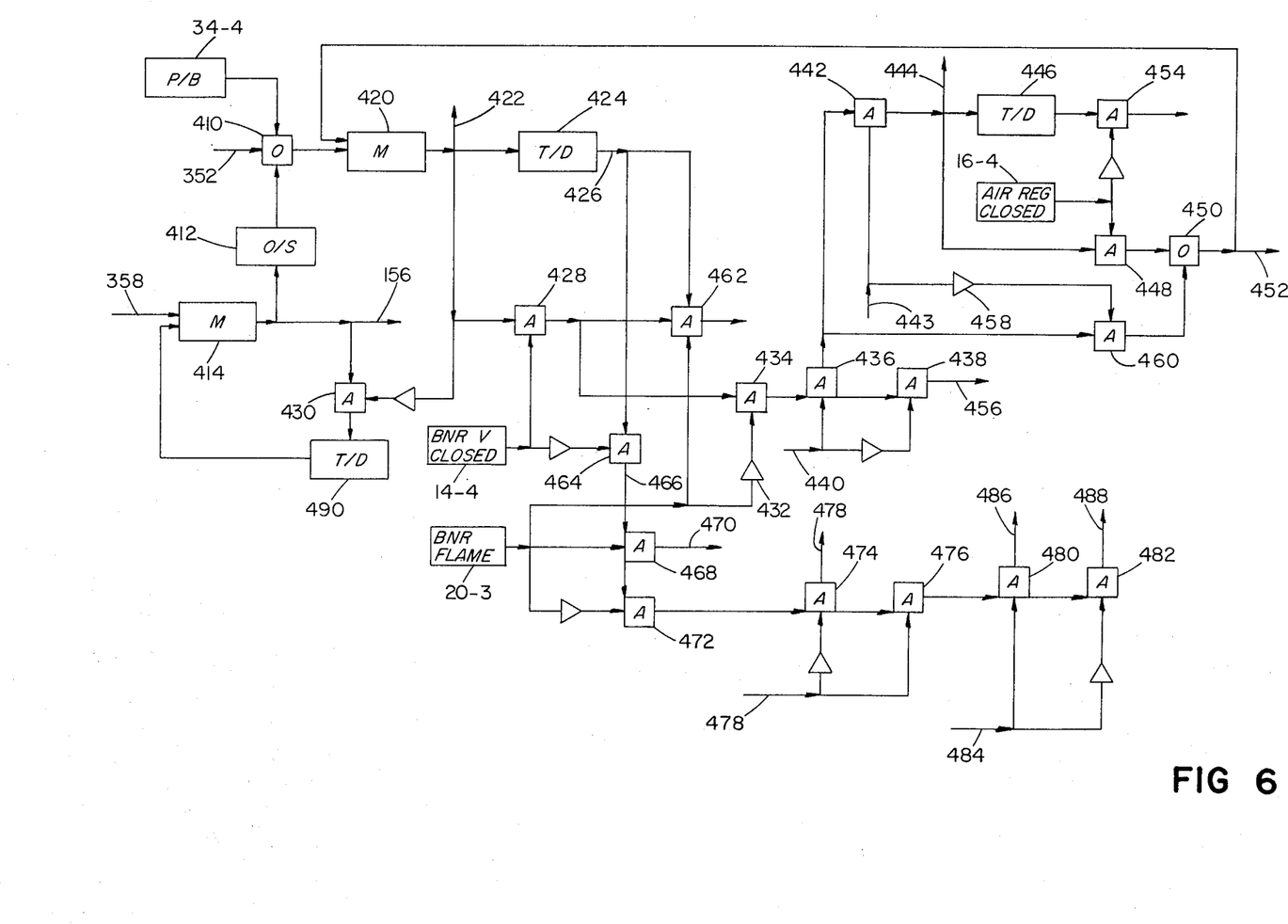
FIG. 6 is a logic diagram of a portion of the logic including the burner shutdown logic incorporated in the system shown in FIG. 1.

Igniter shutdown logic is shown in FIG. 5. An input to OR circuit 350 produces an output on line 352 and a trip of both the burner and associated logic without a relight sequence; and input to OR-circuit 354 alone will trip the igniter only without a relight sequence; an input to OR-circuit 356 trip of both the burner and associated lighter but with a relight sequence; and an input to OR-circuit 360 will trip the igniter only with a relight sequence. The output of either OR-circuit 354 or 360 triggers a one shot 362, 364, respectively, and each one shot sets a corresponding memory 366, 368. Memory 366 can also be set by Igniter Off pushbutton 34–3 or by an output from memory 368 (line 166) through OR circuit 370.

If memory 368 is set and memory 366 is not set, AND-circuit 372 has an output which triggers 1-minute timer 374 and after that 1 minute delay triggers one shot 376 to pass a pulse to reset memory 364. During this interval of time there is an output on line 166 that inhibits initiation of an igniter sequence (FIG. 3).

If relight is not allowed, memory 366 is set and its output produces a signal on line 380 to close igniter valve 22 and prevent the start of any burner, and to trigger timer circuit 382. Operation of timer 374 is inhibited; and AND-circuit 384 is conditioned. When the igniter valve switch 22–4 indicates the igniter valve 22 is closed, AND-circuit 384 produces an output through single shot 386 to generate a signal on line 388 indicating that igniter shutdown is complete and resets the Igniter Only memory 188 and the Igniter On memory 246(FIG. 3). That signal also resets memory 366. The output signal from AND-circuit 384 is also applied through OR-circuit 390, and if no other burners are on, indicated by a signal on line 392, AND-circuit 394 produces an output on line 396 to complete the shutdown of the burner. If the igniter valve is not closed (contacts 22–4) by the time the time delay 382 has expired (5 seconds), AND-circuit 400 produces an output on line 402 to close the igniter fuel trip valve and also produces a signal on line 396 if no other burners are on.

A diagram of the burner shutdown logic is shown in FIG. 6. That logic includes an OR-circuit 410 which responds to either a signal from Burner Shut Down pushbutton 34–4, a signal from the igniter shutdown logic (FIG. 5) on line 352, or a signal from one shot 412. It will be obvious that this logic and the igniter shutdown logic as well may respond to those signals. One shot 412 produces an output when memory 414 is set in response to a signal on line 358 from the igniter shutdown logic. The output of OR-circuit 410 sets memory 420 and produces a signal on line 422 to shut the burner valve 14. A signal is also applied to timer 424 which produce an output on line 426 after 5 seconds, to AND-circuit 428 which produces an output as soon as interface switch 14-4 indicates the burner shutoff valve 14 is closed, and a conditioning signal is removed from AND-circuit 430. If the flame detector 20 provides a signal via switch 20-3 and inverter 432 indicating that it does not see flame, AND-circuit 434 has an output which samples AND-circuits 436 and 438. If another burner is on as indicated by a signal on line 440, AND-circuit 436 produces an output which is applied to AND-circuit 442 and if closing of the air register is permitted (line 443) a close air register command is generated on line 444 and a ten second time delay via delay logic 446 is started. As soon as the air register 16 is closed indicated by interface switch 16-4, AND circuit 448 has an output which is passed by OR-circuit 450 to provide a signal on line 452 indicating the burner shutdown in complete. This signal is fed back to reset memory 420. Should the timer 446 time out before the air register 16 is closed, AND-circuit 454 produces an output indicating that the air register is not closed. Should this be the last burner in the combustion system to shut down, AND-circuit 438 will produce an output on line 456 as a boiler trip signal. Alternately, if air flow is low, a signal from inverter 458 conditions AND-circuit 460 and an output on line 452 is immediately generated.

When the 5-second time delay produced by timer 424 expires AND-circuits 462 and 464 have conditioning inputs. If the flame detector 20 sees flame and the burner shutoff valve is closed an alarm signal is generated by AND-circuit 462 to indicate that flame is indicated on but the burner shutoff valve is closed. If the burner shutoff valve is not closed at the end of five seconds, AND-circuit 464 produces an output on line 466 indicating that the valve is not closed. If flame is indicated AND-circuit 468 produces a signal on line 470. If flame is out but the valve is not closed, AND-circuit 472 produces an output that conditions AND-circuit 474 and 476. If more than the minimum number of burners are in service (line 478), a signal is generated by AND-circuit 474 on output line 478 producing a boiler fuel trip. Should an adequate number of burners be on, AND-circuit 476 produces an output which is applied to condition AND-circuits 480 and 482 which monitor a signal on line 484 indicating the burners in service are operating at high load. If AND-circuit 480 produces an output on line 486 it indicates a burner shutdown failure, that is the shutdown valve is not closed but flame is out and more than the minimum number of burners are firing while if AND-circuit 482 produces an output on line 488 produces a boiler trip signal indicating that flame is out and the valve is not closed.

If memory 414 is set before memory 420, AND-circuit 430 has an output which triggers one minute time delay 490 and that timer produces an output to reset memory 414 and permit recycling or attempted reignition (relight).

Figure 7A:
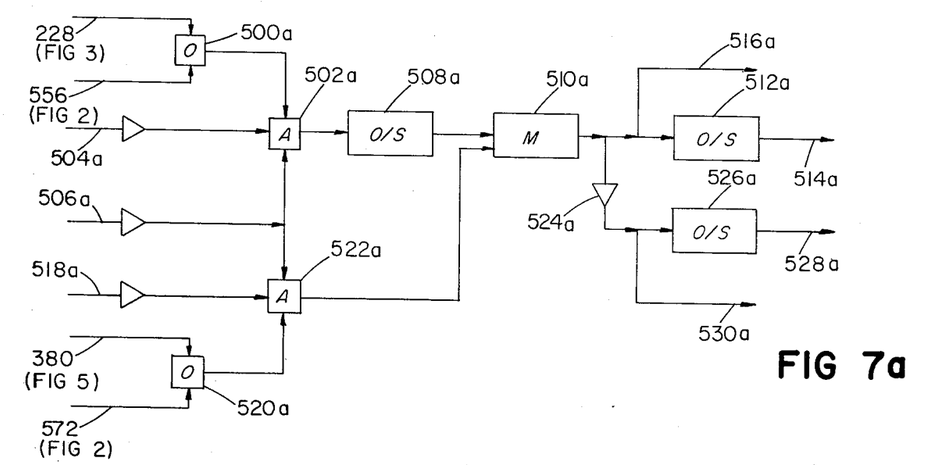
FIGS. 7a-c are logic diagrams of a portion of the logic including the valve and register control logic employed in the system shown in FIG. 1.
Figure 7B:
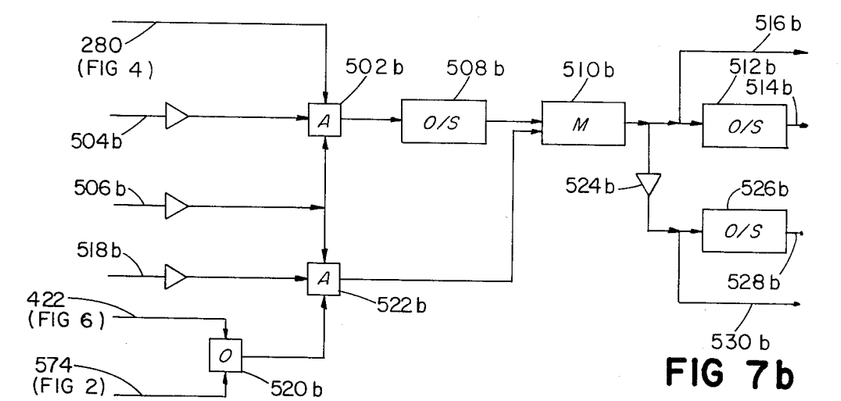
Figure 7C:
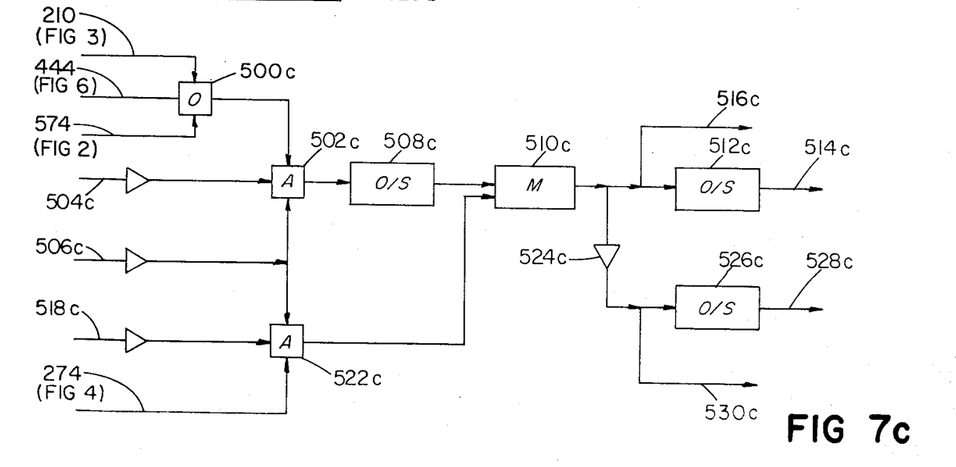

Logic circuits showing controls of the igniter and burner valves and the air register are shown in FIG. 7a, b, and c, respectively. Each logic receives open commands through OR-circuit 500 which pass a signal to AND-circuit 502 which has inhibit inputs on lines 504 and 506. The output of AND-circuit 502 is applied to one shot circuit 508 to set memory 510 indicating that the valve or register is to be opened. When the memory is set, it produces an output through one shot 512 as an open pulse on line 514 and an open level signal on line 516 indicating that the device has been commanded open. A close signal is applied to OR circuit 520 and its AND-circuit 522. If not inhibited (line 506 or 518), it will reset memory 510 and that reset transition will be applied by inverter 524 to produce a close pulse from one shot 526 on line 528 and a close level signal on line 530.

Thus it will be seen that this logic enables automatic sequencing and supervision of the burner in an automatic mode of operation. It is, however, necessary to check the logic circuitries periodically either for routine preventive maintenance or to cure a defect. In that condition the burner control is switched to the automatic logic override or "manual" mode by operation of control switch 38-2. In this position the "manual" contacts of switch 38-2 in FIG. 2 are closed, conditioning clock 542 to produce output pulses on line 544, the pulses being 1 millisecond in duration and occurring at 10-millisecond intervals. Each pulse is applied to sample AND-circuits 550, 552, 554, and 556; and resets memories 188, 192, 222, and 246 (FIG. 3) and memories 272, 288 and 332 (FIG. 4). A second input to AND-circuit 550 is from the Burner On signal on line 62 and in that condition AND-circuit 550 applies an output to one shot circuit 560 which produces a pulse of 2 milliseconds duration on line 562 which is applied to OR-circuit 270 (FIG. 4) to update the status of memory 272. In similar manner, if there is a signal on line 66 (Igniter On), AND-circuit 552 is conditioned and when sampled, triggers one shot 564 produces an output on line 566 which is applied through OR-circuit 244 to set the Igniter On memory 246 (FIG. 3) and through OR-circuit 500 to set IGR V OPEN memory 510a (FIG. 7). The output on line 566 is also applied to AND-circuit 568 which has a second conditioning input from line 72 and if the burner is off, that output signal on line 570 is applied through OR-circuit 186 to set the igniter only memory 188 (FIG. 3). If AND-circuit 554 is conditioned (Igniter not on), its output pulse on line 572 is applied through OR-circuit 520a to reset the igniter valve memory 510a (FIG. 7). Finally, if AND-circuit 556 is conditioned by a signal from the burner logic (FIG. 4) passed by inverter 134 indicating the burner is not on and confirmed by the interface logic (line 72) that the burner is off, AND-circuit 556 has an output on line 574 as a close burner valve signal (FIG. 7b) and a close air register signal (FIG. 7c). Thus each pulse on line 544 updates the memories of the logics shown in FIG. 3-7 and maintains those memories in a current status in accordance with the settings of the interface switches.

When switch 38 is switched from manual to automatic mode, switch 38-2 opens and inverter 580 has an output pulse which triggers one shot 582 that produces a 4-millisecond pulse which provides a conditioning input to AND-circuit 106. To avoid pulse splitting, each output pulse on line 544 is applied through 2-millisecond one shot 584 and inverter 586 so that the conditioning of AND-circuit 106 is delayed for 2 milliseconds, thus avoiding a possible ambiguous signal due to generation of a clock pulse at substantially the same time that the switch 38–2 is changed from manual to automatic position. After the interface field switches have been interrogated during the first 2 millisecond interval if a trip condition exists as the switch is moved from manual to automatic position, the output on line 588 is applied to OR-circuit 356 (FIG. 5) to trip the igniter and that logic in turn trips the burner through the logic shown in FIG. 6.

While a particular embodiment of the invention has been shown and described, various modifications thereof will be obvious to those skilled in the art. Therefore, it is not intended that the invention be limited to the disclosed embodiment or to details thereof, but departures may be made therefrom within the spirit and scoop of the invention.

What is claimed is:

1. A control system for controlling a burner system that includes main and secondary fuel burner components, associated fuel and air flow control components and flame detector components, said control system having a plurality of field indicators that provide signals indicative of the condition of said burner system components, control logic responsive to said field indicators for providing burner control signals, logic bypass control, and circuitry responsive to said logic bypass control for establishing the status of said control logic as a function of said field indicators so that said control logic is maintained in synchronism with said field indicators.

2. The burner control system as claimed in claim 1 wherein said control logic includes a plurality of memories indicative of the status of supervised components of the burner system, and said logic bypass control samples said field indicators and updates said memories periodically.

3. The burner control system as claimed in claim 1 and further including means responsive to deactivation of said logic bypass control for checking synchronism of said control logic with said field indicators.

4. The burner control system as claimed in claim 1 wherein said logic bypass control responsive circuitry includes means for periodically sensing the condition of said field indicators and maintaining said control logic in synchronism with said field indicators.

5. The burner control system as claimed in claim 1 wherein said logic bypass control responsive circuitry includes means providing a trip condition signal and means including a delay to sense said trip condition signal providing means in response to a request for transfer from logic bypass mode to automatic mode.

6. The burner control system as claimed in claim 1 wherein said control logic is a sequential logic system that employs solid state static switching circuits, and input signals from said field indicators are introduced to said control logic through input interfaces, said control logic generating appropriate commands to control the associated field equipment through output interfaces in response to said input signals.

7. The burner control system as claimed in claim 6 wherein said logic bypass control includes means for periodically sensing the condition of said field indicators and maintaining said control logic in synchronism with said field indicators.

8. The burner control system is claimed in claim 7 wherein said logic bypass control includes trip condition indicator means and means including a delay to sense said trip condition indicator in response to a request for transfer from logic bypass mode to automatic mode.

9. A control system for controlling a burner system that includes main and secondary fuel burner components, associated fuel and air flow control components and flame detector components, said control system having a plurality of field indicators that provide signals indicative of the condition of said burner system components, control logic responsive to said field indicators for providing burner control signals, said control logic being a sequential logic system that employs solid state static switching circuits, and including input interfaces for introducing input signals from said field indicators to said control logic, and output interfaces for coupling commands generated by said control logic in response to said input signals to control the associated fuel and air flow control components, logic bypass control including means for periodically sensing the condition of said field indicators and maintaining said control logic in synchronism with said field indicators, means providing a trip condition signal, and means including a delay to sense said trip condition signal providing means in response to a request for transfer from logic bypass mode to logic control mode, and circuitry responsive to said logic bypass control for establishing the status of said control logic as a function of said field indicators so that said control logic is maintained in synchronism with said field indicators and means responsive to deactivation of said logic bypass control for checking synchronism of said control logic with said field indicators.

10. The burner control system as claimed in claim 9 wherein said control logic includes digital logic responsive to said field indicators and memories responsive to said digital logic for storing signals indicative of the status of supervised components of the burner system, and said logic bypass control includes digital means for sampling said field indicators and updating said memories periodically.

11. The burner control system as claimed in claim 1 wherein said control logic includes digital logic responsive to said field indicators and memories responsive to said digital logic for storing signals indicative of the status of supervised components of the burner system, and said logic bypass control includes means for sampling said field indicator responsive digital logic and updating said memories periodically, means providing a trip condition signal and means including a delay for sensing said trip condition signal providing means in response to a request for transfer from logic bypass mode to logic control (automatic) mode.

* * * * *